US012620620B2

(12) United States Patent (10) Patent No.: US 12,620,620 B2

Han et al. (45) Date of Patent: May 5, 2026

(54) LAYERED GEL-POLYMER ELECTROLYTES AND METHODS OF FORMING THEREOF

(71) Applicant: Gru Energy Lab Inc., San Jose, CA (US)

(72) Inventors: Song Han, Foster City, CA (US); Sa Zhou, Fremont, CA (US); Xinghua Meng, San Jose, CA (US)

(73) Assignee: GRU Energy Lab Inc., San Jose, CA (US)

( * ) Notice: Subject to any disclaimer, the term of this patent is extended or adjusted under 35 U.S.C. 154(b) by 0 days.

(21) Appl. No.: 18/460,893

(22) Filed: Sep. 5, 2023

(65) Prior Publication Data

US 2023/0411686 A1    Dec. 21, 2023

Related U.S. Application Data

(63) Continuation of application No. 17/111,070, filed on Dec. 3, 2020, now abandoned.

(Continued)

(51) Int. Cl.
H01M 10/0565    (2010.01)
H01M 10/0525    (2010.01)
(Continued)

(52) U.S. Cl.
CPC ... H01M 10/0565 (2013.01); H01M 10/0525 (2013.01); H01M 50/431 (2021.01);
(Continued)

(58) Field of Classification Search
CPC ............. H01M 50/449; H01M 50/451; H01M 50/454; H01M 50/457; H01M 50/461; H01M 10/052; H01M 10/0525
See application file for complete search history.

(56) References Cited

U.S. PATENT DOCUMENTS 5,296,318 A    3/1994  Gozdz et al.
5,540,741 A    7/1996  Gozdz et al.
(Continued)

FOREIGN PATENT DOCUMENTS

JP       2000299129 A    10/2000
KR    20160069386 A  *  6/2016  ............ H01M 50/44

OTHER PUBLICATIONS

U.S. Appl. No. 17/111,070, Final Office Action mailed Apr. 5, 2023, 16 pgs.

(Continued)

*Primary Examiner* — Jeremiah R Smith

(74) *Attorney, Agent, or Firm* — Polygon IP, LLP

(57)    ABSTRACT

Provided are layered gel-polymer electrolytes and electrochemical cells comprising these electrolytes as well as methods of forming the electrolytes and the cells. A gel-polymer electrolyte comprises a support core and one or two interface layers on the core surface. The interface layers are relied on to conform to electrode surfaces with high surface roughness, while the support core prevents any physical penetration and electrical shorts through the gel-polymer electrolyte, e.g., by electrode protruding peaks. Specifically, the interface layer redistributes around these protruding peaks and forms a continuous interface with the electrode surface. When the stack is compressed, the gel-polymer electrolyte also releases some liquid electrolyte, which soaks the electrode and enhances ionic transfer within the electrode and through the electrolyte-electrode interface. The gel-polymer electrolyte is formed by coating interface layers on the support core and soaking this assembly in a liquid electrolyte.

17 Claims, 5 Drawing Sheets

Related U.S. Application Data

(60) Provisional application No. 62/943,145, filed on Dec. 3, 2019.

(51) Int. Cl.

| | |
|---|---|
| *H01M 50/431* | (2021.01) |
| *H01M 50/449* | (2021.01) |
| *H01M 50/457* | (2021.01) |
| *H01M 4/02* | (2006.01) |

(52) U.S. Cl.
CPC ....... *H01M 50/449* (2021.01); *H01M 50/457* (2021.01); *H01M 2004/027* (2013.01); *H01M 2004/028* (2013.01); *H01M 2300/0085* (2013.01); *H01M 2300/0094* (2013.01)

(56) References Cited

U.S. PATENT DOCUMENTS

| | | | |
|---|---|---|---|
| 6,509,123 | B1 | 1/2003 | Shibuya et al. |
| 2004/0146785 | A1 | 7/2004 | Mizutani et al. |
| 2007/0072069 | A1 | 3/2007 | Yamada et al. |
| 2011/0217585 | A1 | 9/2011 | Wang et al. |
| 2013/0224556 | A1 | 8/2013 | Hong et al. |
| 2015/0004464 | A1 | 1/2015 | Okuno et al. |
| 2015/0263325 | A1 | 9/2015 | Honda et al. |
| 2016/0149178 | A1 | 5/2016 | Kawamura et al. |
| 2016/0285064 | A1 | 9/2016 | Hatta et al. |
| 2017/0077477 | A1 | 3/2017 | Zhao et al. |
| 2017/0092982 | A1* | 3/2017 | Kuo ........................ B01J 41/13 |
| 2019/0245182 | A1 | 8/2019 | Liao et al. |
| 2019/0273238 | A1 | 9/2019 | Mizuno et al. |

OTHER PUBLICATIONS

U.S. Appl. No. 17/111,070, Non Final Office Action mailed Oct. 14, 2022, 17 pgs.

Jeong, Yeon-Bok et al., Effect of thickness of coating layer on polymer-coated separator on cycling performance of lithium-ion polymer cells, Journal of Power sources 128.2 (2004) pp. 256-262.

Pandey, Gaind P. et al., Effective Infiltration of Gel Polymer Electrolyte into Silicon-Coated Vertically Aligned Carbon Nanofibers as Anodes for Solid-State Lithium-ion Batteries, AACS applied materials & interfaces 7.37 (2015) pp. 20909-20918.

* cited by examiner

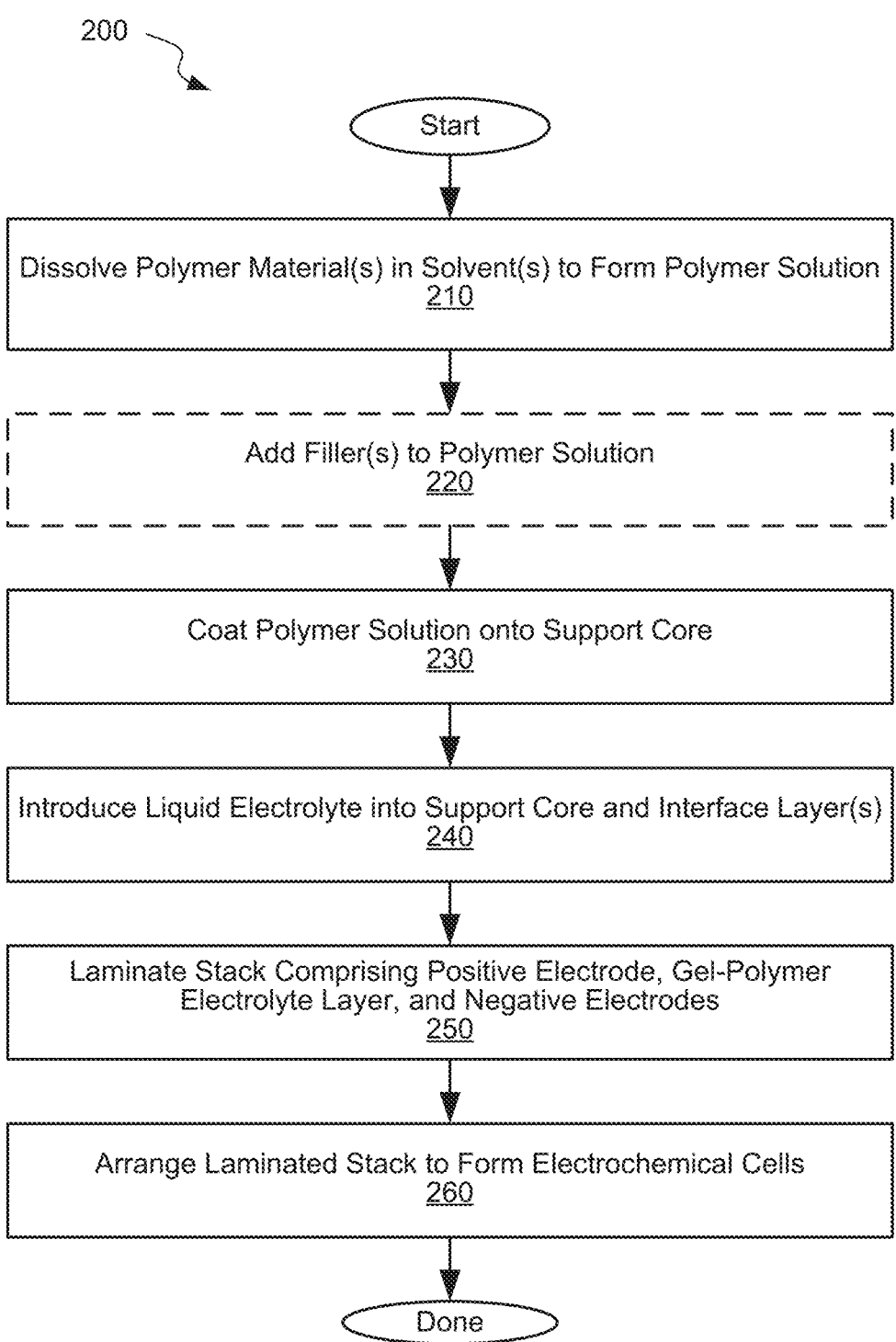

200

Start

Dissolve Polymer Material(s) in Solvent(s) to Form Polymer Solution
210

Add Filler(s) to Polymer Solution
220

Coat Polymer Solution onto Support Core
230

Introduce Liquid Electrolyte into Support Core and Interface Layer(s)
240

Laminate Stack Comprising Positive Electrode, Gel-Polymer Electrolyte Layer, and Negative Electrodes
250

Arrange Laminated Stack to Form Electrochemical Cells
260

Done

*FIG. 2*

LAYERED GEL-POLYMER ELECTROLYTES AND METHODS OF FORMING THEREOF

CROSS-REFERENCE TO RELATED APPLICATIONS

This application is a continuation of U.S. application Ser. No. 17/111,070, filed on 2020 Dec. 3, which claims the benefit under 35 U.S.C. § 119(e) of U.S. Provisional Patent Application No. 62/943,145, filed on 2019 Dec. 3, which is incorporated herein by reference in its entirety for all purposes.

TECHNICAL FIELD

The present disclosure relates generally to layered gel-polymer electrolytes, electrochemical cells comprising these layered gel-polymer electrolytes, and methods of forming these layered gel-polymer electrolytes and forming these electrochemical cells.

BACKGROUND

High-capacity rechargeable electrochemical cells with long cycle lives are desirable for various applications, such as electronics, electric vehicles (EVs), and power tools. Various types of electrochemical cells are being developed to meet different application needs, such as increasing the energy and power density of the cells. One approach involves incorporating new active material structures (e.g., particles) that have large surface areas or, more specifically, large electrochemically active surface areas. However, particles with large surface areas are usually used for electrodes with high surface roughness. Rough electrode surfaces, in turn, may result in poor contact and unstable interfaces between these electrodes and conventional liquid electrolytes. For example, various undesirable reactions between electrode materials, exposed on these surfaces, and electrolytes can cause decomposition, lithium-ion trapping, or other problems. In extreme examples, these problems can even cause thermal runaways of electrochemical cells.

Gel-polymer electrolytes have been proposed as a solution for reducing undesirable reactions at the electrode-electrolyte interface. However, integrating gel-polymer electrolytes into electrochemical cells (e.g., lithium-ion cells) has been challenging. Various attempts have been used with limited success. One approach involves applying a polymer solution onto an electrode, followed by a solvent-plasticizer extraction. However, this process is not efficient and provides poor porosity control of the resulting electrolyte layer. Furthermore, this approach requires significant amounts of liquid electrolyte, which is not practical.

Another approach involves forming a gel-polymer electrolyte by dissolving a lithium-containing electrolyte salt in a non-aqueous solvent and a polymer host/matrix. Gel-polymer electrolyte sublayers are then formed on both negative and positive electrodes, collectively forming electrode-electrolyte subassemblies. An electrochemical cell is then formed by stacking these subassemblies. The uniformity is hard to control with this approach when a gel-polymer electrolyte is applied directly onto the electrodes with active material layers often causing electrical shorts.

Yet another approach involves mixing a liquid electrolyte with a polymer monomer. Cell fabrication is similar to using a conventional liquid electrolyte, which involves filling the electrolyte-polymer mixture into a partially assembled cell, followed by thermal-initiated polymerization of the monomer in the mixture. This post-assembly polymerization forms the gel-polymer electrolyte in situ between the electrodes in electrochemical cells. However, some monomers may remain unreacted. Furthermore, the thermal-initiated polymerization requires high temperatures, which may be undesirable for other components of these cells, such as a separator and insulators.

What is needed are layered gel-polymer electrolytes, electrochemical cells formed using these layered gel-polymer electrolytes, and methods of forming these layered gel-polymer electrolytes and also forming these electrochemical cells.

SUMMARY

Provided are layered gel-polymer electrolytes and electrochemical cells comprising these electrolytes as well as methods of forming the electrolytes and the cells. A gel-polymer electrolyte comprises a support core and one or two interface layers on the core surface. The interface layers are relied on to conform to electrode surfaces with high surface roughness, while the support core prevents any physical penetration and electrical shorts through the gel-polymer electrolyte, e.g., by electrode protruding peaks. Specifically, the interface layer redistributes around these protruding peaks and forms a continuous interface with the electrode surface. When the stack is compressed, the gel-polymer electrolyte also releases some liquid electrolyte, which soaks the electrode and enhances ionic transfer within the electrode and through the electrolyte-electrode interface. The gel-polymer electrolyte is formed by coating interface layers on the support core and soaking this assembly in a liquid electrolyte.

In some examples, a layered gel-polymer electrolyte for pacing between a first electrode and a second electrode of an electrochemical cell comprises a support core, comprising a first surface and a second surface, opposite of the first surface. The support core is configured to prevent physical penetration and electrical shorts between the first electrode and the second electrode of the electrochemical cell. The layered gel-polymer electrolyte further comprises a first interface layer, disposed on and directly interfacing the first surface of the support core. The first interface layer is configured to conform to the surface of the first electrode of the electrochemical cell. The layered gel-polymer electrolyte also comprises a liquid electrolyte, comprising an electrolyte solvent and an electrolyte salt. The liquid electrolyte is distributed within at least one of the support core and the first interface layer.

In some examples, the second surface of the support core is exposed. Alternatively, the layered gel-polymer electrolyte further comprises a second interface layer, disposed on and directly interfacing with the second surface of the support core. The second interface layer is configured to conform to the surface of the second electrode of the electrochemical cell.

In some examples, the support core comprises at least one of polypropylene (PP), polyethylene (PE), poly(ethylene-co-tetrafluoroethylene (PETFE), poly(ethylenechloro-co-trifluoroethylene), polystyrene, polyvinyl chloride polypropylene, polyamide, polyimide, polyacrylic, polyacetal, polycarbonate, polyester, polyetherimide, polyimide, polyketone, polyphenylene ether, or polyphenylene sulfide.

In some examples, the support core has a porosity of between 30% and 60%. For example, the support core comprises a surface layer, forming at least one of the first surface or the second surface of the support core. The surface layer comprises one or more ceramic materials. In some examples, one or more ceramic materials of the surface layer of the support core comprise at least one of $Al_2O_3$, $SiO_2$, or MgO.

In some examples, the first interface layer comprises at least one of polyvinylidene fluoride-co-hexafluoropropylene (PVDF-HFP), polyacrylonitrile (PAN), poly(methyl methacrylate) (PMMA), or polyethylene oxide (PEO). In the same or other examples, the first interface layer is softer than the support core. For example, the first interface layer has a porosity of between 30% and 60%. In some examples, the first interface layer has a thickness of at least about 20 micrometers.

In some examples, the liquid electrolyte is distributed within both the support core and the first interface layer. In the same or other examples, the electrolyte solvent comprises at least one of ethylene carbonate (EC), propylene carbonate (PC), butylene carbonate (BC), vinylethylene carbonate (VEC), gamma-butyrolactone (GBL), gamma-valerolactone (GVL), and alpha-angelica lactone (AGL), dimethyl carbonate (DMC), methyl ethyl carbonate (MEC), diethyl carbonate (DEC), methyl propyl carbonate (MPC), dipropyl carbonate (DPC), methyl butyl carbonate (NBC), dibutyl carbonate (DBC), tetrahydrofuran (THF), 2-methyl-tetrahydrofuran, 1,4-dioxane, 1,2-dimethoxyethane (DME), 1,2-diethoxyethane and 1,2-dibutoxyethane, acetonitrile, adiponitrile, methyl propionate, methyl pivalate, butyl pivalate, octyl pivalate, or dimethyl formamide. The electrolyte salt may comprise at least one of $LiPF_6$, $LiRF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$).

Also provided is an electrochemical cell, In some examples, the electrochemical cell comprises a positive electrode, a negative electrode, and a layered gel-polymer electrolyte, disposed between and directly interfacing each of the positive electrode and the negative electrode. The layered gel-polymer electrolyte comprises a support core, a first interface layer, and a liquid electrolyte. The support core comprises a first surface and a second surface, opposite the first surface. The support core is configured to prevent physical penetration and electrical shorts between the positive electrode and the negative electrode. The first interface layer is disposed on the support core and directly interfaces the first surface of the support core. The first interface layer conforms to the surface of the positive electrode or the surface of the negative electrode. The liquid electrolyte comprises an electrolyte solvent and an electrolyte salt. The liquid electrolyte is distributed within at least one of the support core and the first interface layer.

In some examples, the electrochemical cell is a lithium-ion cell. In the same or other examples, the first interface layer conforms to the surface of the negative electrode. In some examples, the support core directly interfaces with the positive electrode. In more specific examples, the layered gel-polymer electrolyte further comprises a second interface layer, disposed on the support core and directly interfacing the second surface of the support core. The second interface layer conforms to the surface of the positive electrode. In some examples, the thickness of the first interface layer is greater than the surface roughness of the surface of the negative electrode.

Also provided is a method of forming a layered gel-polymer electrolyte for an electrochemical cell. In some examples, the method comprises dissolving one or more polymer materials in one or more solvents, thereby forming a polymer solution, and coating the polymer solution onto the first surface of a support core. This coating operation forms a first interface layer, disposed over and in contact with the first surface of the support core, The method also comprises introducing a liquid electrolyte into at least one of the support core and the first interface layer.

In some examples, the method further comprises adding one or more fillers to the polymer solution. For example, one or more fillers comprise at least one of titanium dioxide $(TiO_2)$, silicon dioxide $(SiO_2)$, aluminum oxide $(Al_2O_3)$, a sulfide compound, garnet-structure oxide, NASICON-type phosphate glass-ceramic, an oxynitride, and an AB3-type hydrogen storage alloy. In some examples, the method further comprises adding water to the polymer solution.

In some examples, introducing the liquid electrolyte into at least one of the support core and the first interface layer comprises degassing the support core and the first interface layer. In some examples, the method further comprises passing the support core and the first interface layer through a drying roll to remove an unabsorbed portion of the liquid electrolyte. In some examples, the method further comprises coating the polymer solution onto a second surface of the support core, thereby forming a second interface layer, disposed over and in contact with the second surface of the support core, such that the support core is disposed between the first interface layer and the second interface layer. In some examples, the method further comprises laminating the first interface layer together with an electrode of the electrochemical cell.

BRIEF DESCRIPTION OF THE DRAWINGS

FIG. 2 is a process flowchart corresponding to a method of fabricating a layered gel-polymer electrolyte and integrating this layered gel-polymer electrolyte into an electrochemical cell, in accordance with some examples.

DETAILED DESCRIPTION

Figure 1A:
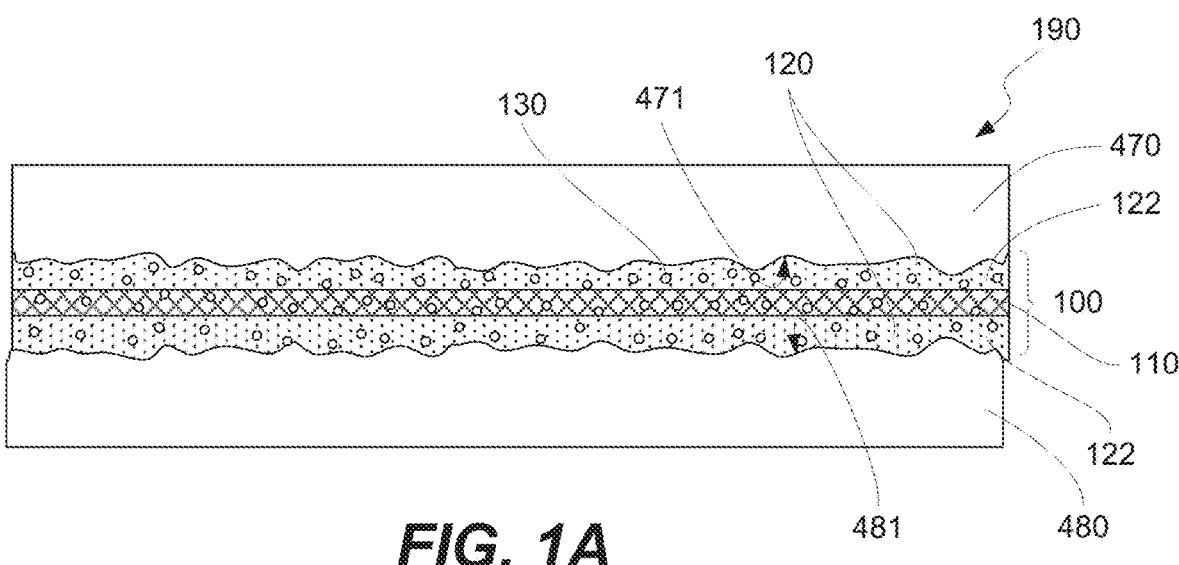
FIG. 1A is a schematic cross-sectional view of an electrode assembly, comprising two electrodes and a layered gel-polymer electrolyte, disposed between and directly interfacing both electrodes, in accordance with some examples.

In the following description, numerous specific details are set forth in order to provide a thorough understanding of the present invention. The present invention may be practiced without some or all of these specific details. In other instances, well-known process operations have not been described in detail to avoid obscuring the present invention.

While the invention will be described in conjunction with the specific examples, it will be understood that it is not intended to limit the invention to the examples.

INTRODUCTION

New applications and designs of electrochemical cells, such as lithium-ion cells, present specific performance and safety requirements for electrolytes used in these cells. Gel-polymer electrolytes are strong candidates for improving the performance and, in particular, the safety of electrochemical cells, in comparison to conventional liquid electrolytes. Specifically, conventional liquid electrolytes comprise organic solvents, which are highly reactive and flammable. Furthermore, these organic solvents are not restricted in any way in the conventional liquid electrolytes and can leak from the cell or otherwise reach undesirable areas. Gel-polymer electrolytes also comprise liquid electrolytes. However, liquid electrolytes are restricted within gel-polymer electrolytes using polymer bases. This restriction still makes the liquid electrolytes available for ionic transfer but in a very controlled manner. For example, gel-polymer electrolytes tend to have less direct physical contact with electrodes in comparison to conventional liquid electrolytes. These smaller interface areas help with reducing various undesirable side reactions and improve the electrochemical performance of the cells. Moreover, trapping liquid electrolytes in polymer bases prevents undesirable leakage and minimizes evaporation, e.g., at high operating temperatures. Furthermore, gel-polymer electrolytes eliminate the need for porous separators between adjacent electrodes.

At the same, conventional gel-polymer electrolytes have not been widely used due to various performance limitations. For example, such conventional gel-polymer electrolytes are not able to form sufficient interfaces with electrodes that have a high surface roughness. Conventional gel-polymer electrolytes are quite rigid and tend to limit these interfaces only to protruding peaks on the electrode surfaces. At the same time, many types of electrodes (e.g., graphite electrode, silicon-carbon, pre-lithiated silicon) have rough surfaces. These surfaces are formed by active material particles. For example, many active material particles have the principal dimension (e.g., the largest size) of about micrometers, and this particle size generally corresponds to high surface roughnesses. When conventional gel-polymer electrolytes interface such electrodes, many gaps and voids typically exist at the interface, resulting in high electronic and ionic interfacial resistances.

Layered gel-polymer electrolytes, described herein, address these issues at the electrode-electrolyte interface y utilizing a unique combination of two different types of components: (1) a support core and (2) one or two interface layers, disposed (e.g., coated) on the support core. Each component of a layered gel-polymer electrolyte is responsible for specific functions. For example, the support core ensures that surrounding electrodes are not able to protrude through the layered gel-polymer electrolyte and cause electrical shorts. This separation is maintained by the support core even when the pressure is applied to the electrode-electrolyte-electrode stack and/or when the surfaces of one or both electrodes in this stack have a high surface roughness. In more specific examples, one or both of these electrodes may have rough surfaces with peaks (e.g., formed by active material particles) protruding towards the electrolyte. The interface layers conform to these electrode surfaces thereby reducing or even eliminating interfacial gaps and voids. This gap-void elimination in turn enhances the electronic and ionic conductivity through the interface, i.e., between the electrodes and the layered gel-polymer electrolyte. Furthermore, the interface layers of the layered gel-polymer electrolyte and, in some examples, the support core are configured to trap a liquid electrolyte during various fabrication stages and to release the liquid electrolyte when the layered gel-polymer electrolyte is positioned inside the cell and between two electrodes and pressure is applied to the electrode-electrolyte-electrode stack (e.g., during initial cycling).

These layered gel-polymer electrolytes are specifically configured to interface and work efficiently with electrodes that have rough surfaces without sacrificing the power and energy density of the resulting cells. The thickness of each interface layer may be specifically controlled to accommodate the surface roughness of the corresponding electrode, which contacts this specific interface layer. It should be noted that layered gel-polymer electrolytes may be used in different types of energy storage devices, such as electrochemical cells (e.g., lithium-ion cells), supercapacitors, and dye-sensitized solar cells (DSSC). While the following description focuses on electrochemical cells, one having ordinary skill in the art would understand that other applications are within the scope.

The fabrication of layered gel-polymer electrolytes is a relatively low-cost process and can be easily scaled up. For example, after coating one or more interface layers on a support core and incorporating liquid electrolyte into this coated assembly, a layered gel-polymer electrolyte can be used in established cell assembly processes, e.g., stacking or winding together with electrodes. In fact, the cell assembly processes are simplified since no separate electrolyte filling step is required after the electrodes are arranged. All required electrolyte components (including any liquid electrolyte) are provided as a part of the layered gel-polymer electrolyte before interfacing with electrodes. Finally, layered gel-polymer electrolytes described herein do not require solvent extraction and hot press processes, used in the manufacturing of some conventional gel-polymer electrolytes (e.g., proposed by Bellcore). As such, there are no risks of plasticizer contamination in electrochemical cells and other negative effects.

Examples of Layered Gel-Polymer Electrolytes and Assemblies Comprising Thereof

FIG. 1A is a schematic cross-sectional view of an electrode assembly 190, comprising layered gel-polymer electrolyte 100, positive electrode 470, and negative electrode 480, in accordance with some examples. Layered gel-polymer electrolyte 100 is disposed between and directly interfaces each of positive electrode 470 and negative electrode 480. Specifically, positive electrode 470 comprises positive electrode surface 471 that directly interfaces layered gel-polymer electrolyte 100, while negative electrode 480 comprises negative electrode surface 481 that directly interfaces layered gel-polymer electrolyte 100. At least one of positive electrode surface 471 and negative electrode surface 481 has a surface roughness of at least 20 micrometers, at least 30 micrometers, or even at least micrometers. This surface roughness is a result, at least in part, of the particle sizes used to form positive electrode 470 and/or negative electrode 480. As described above, conventional gel-polymer electrolytes are not functional with such rough electrode surfaces. This deficiency has been overcome with a unique structure of layered gel-polymer electrolyte 100, which allows gel-polymer electrolyte 100 to conform to positive electrode surface 471 and negative electrode surface 481, despite their high surface roughness.

Figure 1B:
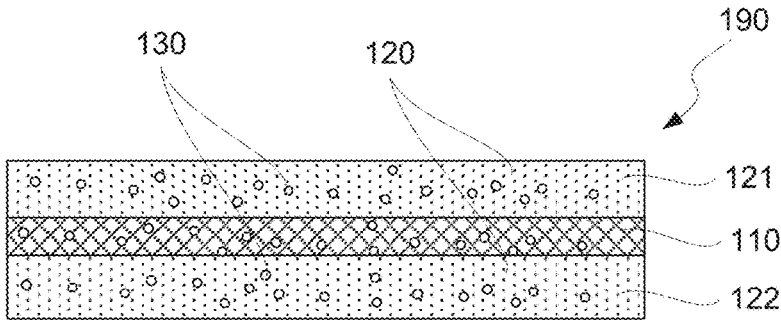
FIG. 1B is a schematic cross-sectional view of a layered gel-polymer electrolyte with two interface layers, prior to stacking and interfacing with any electrodes, in accordance with some examples.

FIG. 1B is a schematic cross-sectional view of layered gel-polymer electrolyte 100, prior to interfacing positive electrode 470 and negative electrode 480, in accordance with some examples. Layered gel-polymer electrolyte 100 comprises support core 110, first interface layer 121, and second interface layer 122. Support core 110 is disposed between and directly interfaces each of the first interface layer 121 and the second interface layer 122. First interface layer 121 and second interface layer 122 may be collectively referred to as interface layers 120. Furthermore, layered gel-polymer electrolyte 100 may be also referred to as a composite gel-polymer electrolyte.

Figure 1C:
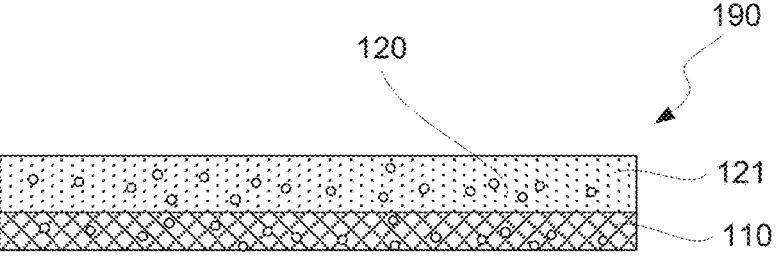
FIG. 1C is a schematic cross-sectional view of a layered gel-polymer electrolyte with only one interface layer, in accordance with some examples.

In some examples, shown in FIG. 1C, layered gel-polymer electrolyte 100 comprises only one interface layer 120, e.g., the first interface layer 121. For example, layered gel-polymer electrolyte 100 is designed to be positioned between one electrode with a rough surface (which would interface first interface layer 121) and one electrode with a smooth surface (which would directly interface support core 110).

To achieve the specific functionality of support core 110 and interface layers 120, the materials and characteristics of support core 110 and interface layers 120 are different. For example, support core 110 comprises at least one of polypropylene (PP), polyethylene (PE), poly(ethylene-co-tetrafluoroethylene (PETFE), poly(ethylenechloro-co-trifluoroethylene), polystyrenes, polyvinyl chlorides polypropylene, polyamides, polyimides, polyacrylics, polyacetals, polycarbonates, polyesters, polyetherimides, polyimides, polyketones, polyphenylene ethers, or polyphenylene sulfides. These materials provide sufficient strength to support core 110 to withstand penetration by electrode rough surfaces. In some examples, support core 110 has a porosity of between 20% and 80% or, more specifically, between 30% and 60% such as between 40% and 50% thereby allowing ionic transfer through support core 110. These pores are filled with a liquid electrolyte, responsible for the ionic transfer through support core 110. At the same time, these pores are responsible for the intake and then retention of the liquid electrolyte during the fabrication, handling, and operation of layered gel-polymer electrolyte 100.

In some examples, the puncture strength of support core 110 may be at least 200 gf or, more specifically, 400 gf. In some examples, the tensile strength of support core 110 is at least about 1500 kgf/cm2 (MD) and at least about 1300 kgf/cm2 (TD). These mechanical characteristics ensure that any peaks on positive electrode surface 471 and negative electrode surface 481 do not protrude through layered gel-polymer electrolyte 100 and cause electrical shorts in an operational cell. It should be noted that these peaks on positive electrode surface 471 and negative electrode surface 481 and allowed to protrude through first interface layer 121 and second interface layer 122. In fact, first interface layer 121 and second interface layer 122 are specifically designed to allow these peaks to protrude through these layers to ensure higher interface areas as described below. However, support core 110 blocks further protrusion of these peaks thereby acting as the final and often the only barrier for these peaks and electrical shorts. The tensile elongation of support core 110 is at least about 40% or even at least about 60%. Furthermore, the shrinkage of support core 110 is less than 5% or even less than 3%. These properties ensure that support core 110 remains intact during the fabrication and handling of layered gel-polymer electrolyte 100 and later fabrication and operation of the electrochemical cell.

Figure 1D:
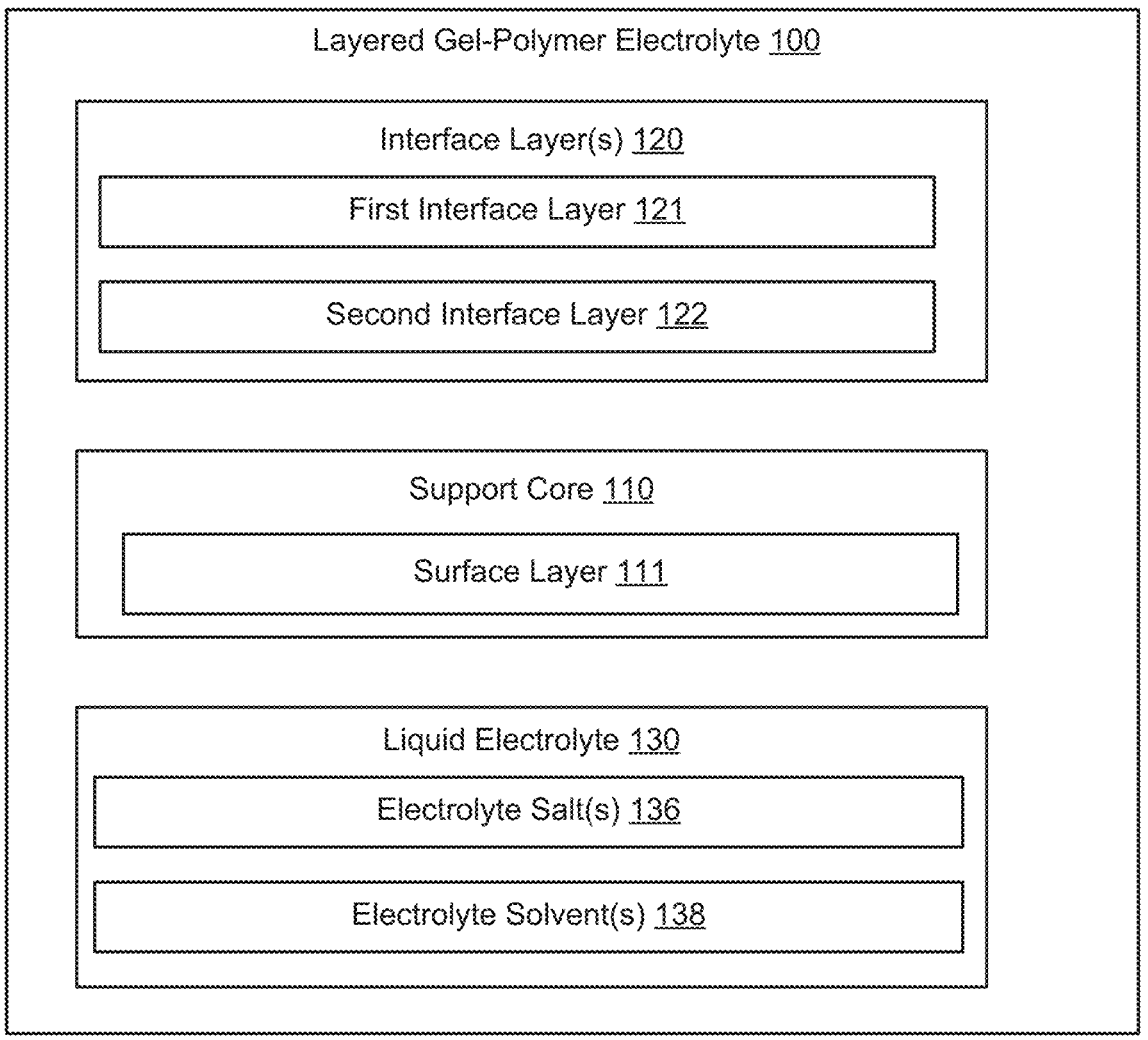
FIG. 1D is a block diagram illustrating various components of a layered gel-polymer electrolyte, in accordance with some examples.

Referring to a block diagram in FIG. 1D, in some examples, support core 110 comprises one or more surface layers 111. Surface layer 111 may be formed from one or more ceramic materials, e.g., $Al_2O_3$, $SiO_2$, and/or MgO. Surface layer 111 of support core 110 should be distinguished from interface layers 120 of layered gel-polymer electrolyte 100. Interface layers 120 are positioned over surface layers 111. Surface layer 111 improves the mechanical stability of support core 110, e.g., to prevent penetration of support core 110 by the peaks on positive electrode surface 471 and negative electrode surface 481.

Interface layers 120 may comprise at least one of polyvinylidene fluoride-co-hexafluoropropylene (PVDF-HFP), polyacrylonitrile (PAN), poly(methyl methacrylate) (PMMA), and/or polyethylene oxide (PEO). Unlike materials of support core 110, the materials of interface layers 120 are much softer and malleable such that interface layers 120 are able to conform to electrode rough surfaces. More specifically, the peaks on positive electrode surface 471 and negative electrode surface 481 are able to at least partially penetrate into interface layers 120 as, e.g., is schematically shown in FIG. 1A. This penetration reduces voids at the electrode-electrolyte interface thereby increasing electronic and ionic conductivities through this interface.

In some examples, interface layers 120 is formed by dissolving a polymer in an organic solvent as further described below. Water may be added to this solution to achieve the desired porosity of resulting interface layers 120, which, in some examples, is between 10% and 90% or, more specifically, between 20% and 80% or even between 30% and 60%. Similar to support core 110, the pores of interface layers 120 are used to fill with a liquid electrolyte, responsible for the ionic transfer through interface layers 120. At the same time, these pores are responsible for the intake and then retention of the liquid electrolyte during fabrication, handling, and operation of layered gel-polymer electrolyte 100. However, unlike support core 110, the pores of interface layers 120 are also responsible for interfacing with positive electrode surface 471 and negative electrode surface 481 and allowing the peaks on positive electrode surface 471 and negative electrode surface 481 to protrude (partially or fully) through the interface layers 120.

Layered gel-polymer electrolyte 100 also comprises liquid electrolyte 130, which is distributed within interface layers 120 and support core 110 as, for example, is schematically shown in FIGS. 1A-1C. Liquid electrolyte 130 provides ionic conductivity through layered gel-polymer electrolyte 100, while interface layers 120 and support core 110 support liquid electrolyte 130 and control the distribution of liquid electrolyte 130 during the fabrication and operation of the electrochemical cell. For example, liquid electrolyte 130 may be retained within layered gel-polymer electrolyte 100 while layered gel-polymer electrolyte 100 is assembled (e.g., stacked or wound) together with electrodes. Specifically, liquid electrolyte 130 is retained without any detectable leakage of liquid electrolyte 130 from layered gel-polymer electrolyte 100. Once this electrode-electrolyte assembly is compressed (e.g., during the initial cycling of the battery), liquid electrolyte 130 is released from layered gel-polymer electrolyte 100 and allowed to soak into the electrodes. As such, an initial cycle of electrochemical cells, formed using layered gel-polymer electrolyte 100, is specifically designed to cause this liquid electrolyte release. It should be noted that electrodes have some initial conductivity, both internally and at the electrode-electrolyte interface before this liquid electrolyte release for initial cycling to start.

Referring to a block diagram in FIG. 1D, liquid electrolyte 130 comprises electrolyte salt 136 (e.g., ion-containing salt, such as lithium salt) and one or more electrolyte solvents 138. Some examples of suitable electrolyte solvents include, but are not limited to, cyclic carbonates (e.g., ethylene carbonate (EC), propylene carbonate (PC), butylene carbonate (BC), vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate, and octyl pivalate), and amides (e.g., dimethyl formamide). Some examples of electrolyte salts include $LiPF_6$, $LiBF_4$, $LiClO_4$ $LiAsF_6$, $LiN(CF_3SO_2)_2$, LiN $(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2$ $(SO_2)_{2x}Li$ and $(CF_2)_3(SO_2)_{2x}Li$), and combination of thereof. The total concentration of one or more salts in liquid electrolyte 130 is at least about 0.3 M or, more specifically, at least about 0.7M.

The thickness of each interface layer 120 can be precisely controlled when interface layer 120 is formed (e.g., coated) on support core 110. For example, the thickness may be controlled by adjusting the coating gap and the concentration of the polymer solution used to form interface layer 120. In some examples, the thickness of interface layer 120 is between 1 micrometer to 200 micrometers such as between 10 micrometers and 100 micrometers or, more specifically, between 10 micrometers and 60 micrometers. The thickness of each interface layer 120 can be specifically selected based on the surface roughness of the electrode, which this interface layer 120 contacts. In some examples, the thickness of interface layer 120 exceeds the surface roughness of the electrode, which this interface layer 120 contacts, e.g., by at least about 10%, at least about 20%, or even at least about 50%. In some examples, the thickness of interface layer 120 is at least about 20 micrometers, at least about 30 micrometers, or at least about 50 micrometers.

When layered gel-polymer electrolyte 100 has two interface layers 120, the thickness of the two interface layers 120 may be the same or different. For example, layered gel-polymer electrolyte 100 is configured to interface with two electrodes having different surface roughness. A thinner interface layer 120 is used to interface the smoother electrode, while a thicker layer is used to interface the electrode having a higher surface roughness. This thickness-to-roughness is tailored to maximize the volumetric and gravimetric capacity of the cell without sacrificing any performance or safety aspects. The thickness of each interface layer 120 is tailored to the surface roughness of the electrode this layer is designed to interface. This correlation ensures minimal voids at the electrode-electrolyte interface without having unnecessary thick interface layers. It should be noted that interface layers with excessive thickness now only negatively impact the volumetric and gravimetric capacity of the cell but also cause additional ionic resistance.

In some examples, the thickness of support core 110 is between 6 micrometers and 100 micrometers. A larger thickness provides better protection from electrode penetration but interferes with ionic transport. Furthermore, a thicker structure occupies more space in an electrochemical cell, which negatively impacts the volumetric and gravimetric capacity of the cell.

Examples of Fabricating Layered Gel-Polymer Electrolytes and Assemblies Comprising Such Electrolytes FIG. 2 is a process flowchart corresponding to method 200 of fabricating layered gel-polymer electrolyte 100 and integrating layered gel-polymer electrolyte 100 into electrochemical cell 450, in accordance with some examples.

Method 200 comprises dissolving one or more polymer materials in one or more solvents, thereby forming polymer solution 310 (block 210). Polymer solution 310 is later used for coating interface layers 120 over support core 110. Some examples of more polymer materials include polyvinylidene fluoride-co-hexafluoropropylene (PVDF-HFP), polyacrylonitrile (PAN), poly(methyl methacrylate) (PMMA), and/or polyethylene oxide (PEO). Some examples of solvents include n-methyl-2-pyrrolidone (NMP), acetone, and tetrahydrofuran (THF). For example, PVDF-HFP may be dissolved in a combination of NMP and acetone. In some examples, water or another porosity-forming agent is added to the polymer solution to control the porosity of interface layers 120. For example, water bubbles evaporate during the drying process, leaving pores inside the solidified polymer.

In some examples, method 200 comprises adding one or more fillers to polymer solution 310 (block 220). Some examples of fillers are inorganic materials, such as titanium dioxide ($TiO_2$) particles, silicon dioxide ($SiO_2$), aluminum oxide ($Al_2O_3$), sulfide compounds (e.g., argyrodite, LGPS, LPS, etc.), garnet structure oxides (e.g., LLZO with various dopants), NASICON-type phosphate glass ceramics (LAGP), oxynitrides (e.g., lithium phosphorus oxynitride or LIPON), and AB3-type hydrogen storage alloy. The fillers improve the mechanical stability of the resulting structures. Furthermore, the filler improves the liquid electrolyte retention, making it harder to push the adsorbed liquid electrolyte from layered gel-polymer electrolyte 100.

Figures 3A, 3B, 3C, 3D, 3E:
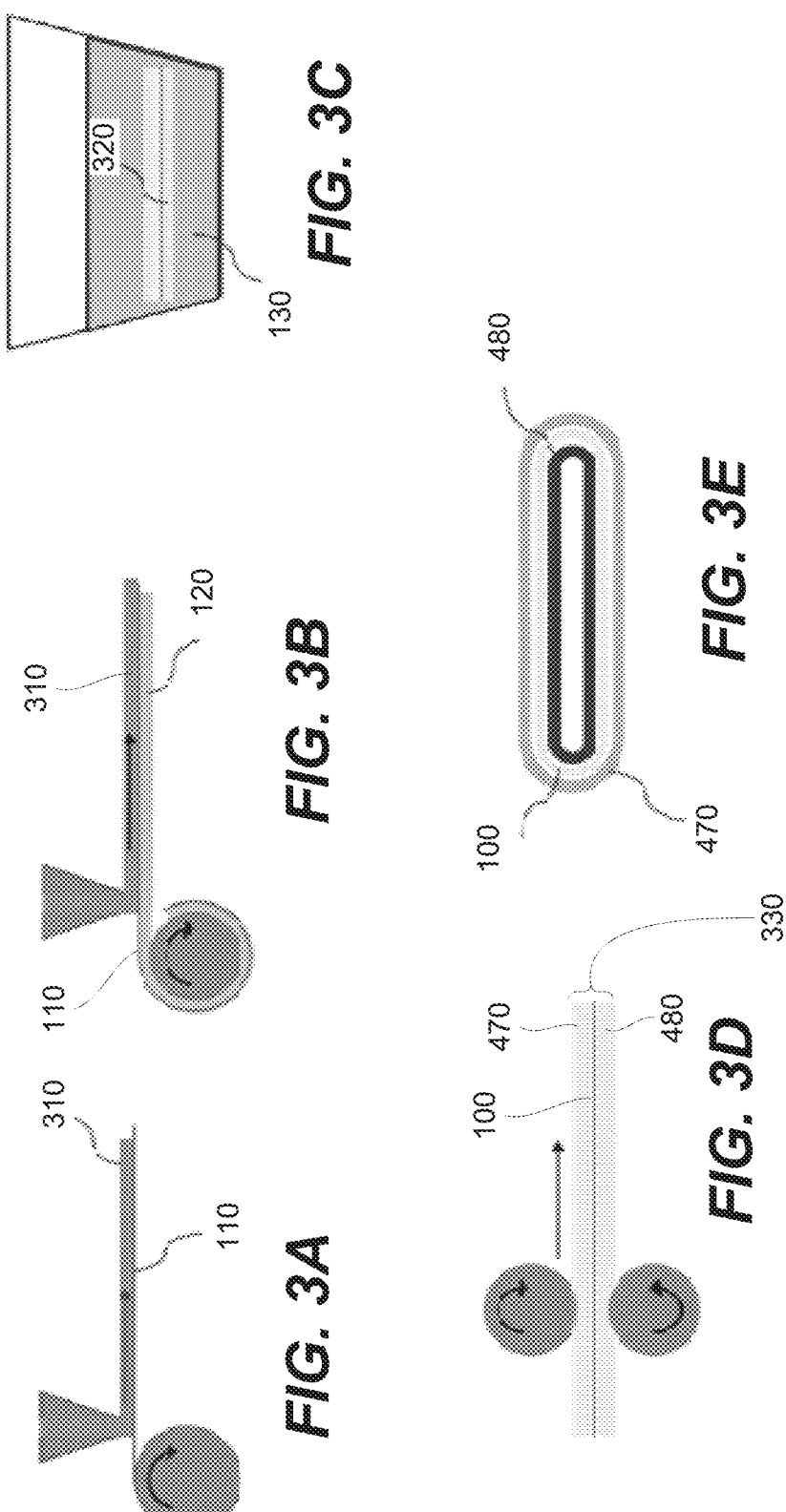
FIGS. 3A-3E are schematic representations of different processing stages of the method in FIG. 2, in accordance with some examples.

Method 200 comprises coating polymer solution 310 onto support core 110 (block 230). For example, the roll-to-roll coating may be used for this operation. This process is schematically shown in FIGS. 3A and 3B. The thickness of the applied polymer solution 310 is controlled by a doctor roll or a doctor blade. The applied polymer solution 310 is then subjected to heating to evaporate solvents and form interface layer 120 over support core 110.

Method 200 proceeds with introducing liquid electrolyte 130 into support core 110 and one or two interface layers 120 (block 240). For example, an assembly comprising support core 110 and one or two interface layers 120, which may be referred to as interface layer-support core assembly 320, is submerged into liquid electrolyte 130 as schematically shown in FIG. 3C. In some examples, a vacuum is applied over the surface of liquid electrolyte 130 to degas the pores in interface layer-support core assembly 320 and introduce liquid electrolyte 130 into the pores. Various examples of liquid electrolyte 130 are described above.

Upon completion of the operation corresponding to block 240, layered gel-polymer electrolyte 100 is formed. For example, after being submerged into liquid electrolyte 130, interface layers support core assembly 320 passes through a drying roll to remove any remaining liquid electrolyte 130 on the assembly surface. The surface of layered gel-polymer electrolyte 100 may be substantially free from liquid electrolyte 130. Instead, liquid electrolyte 130 may be trapped within support core 110 and one or two interface layers 120 of layered gel-polymer electrolyte 100.

Method 200 proceeds with laminating stack 330 comprising positive electrode 470, layered gel-polymer electrolyte 100, and negative electrode 480 (block 250). During this operation, layered gel-polymer electrolyte 100 is positioned between the positive electrode 470 and negative electrode 480 as, for example, is schematically shown in FIG. 3D. Furthermore, during this operation, interface layers 120 conform to the surfaces of one or both positive electrode 470 and negative electrode 480. As described above, one or both of these surfaces may have a high surface roughness. The lamination operation causes the material of interface layers 120 to flow around peaks on these surfaces to ensure conformal contact. In some examples, a portion of liquid electrolyte 130 is transferred from layered gel-polymer electrolyte 100 to one or both of comprising positive electrode 470 and negative electrode 480.

Finally, method 200 proceeds with arranging laminated stack 330 into a shape associated with an electrochemical cell (block 260). For example, laminated stack 330 may be wound into a prismatic jellyroll as schematically shown in FIG. 3E. Alternatively, laminated stack 330 may be wound into a cylindrical jellyroll or stacked. It should be noted that the electrochemical cell is formed during this operation and no further additions of electrolyte to the cell are needed.

Examples of Electrochemical Cells and Applications

Figure 4:
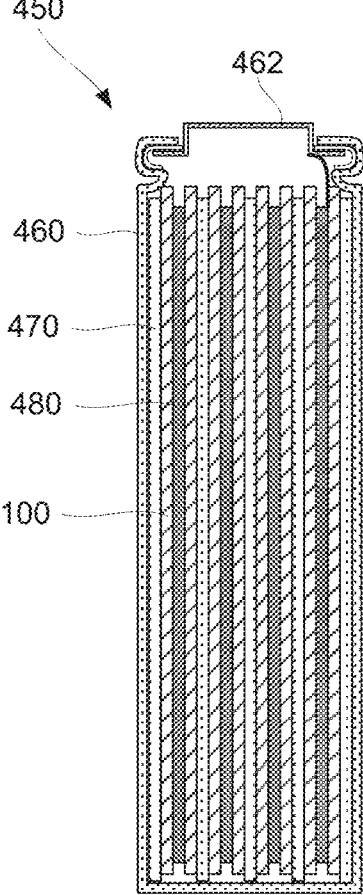
FIG. 4 is a schematic illustration of an electrochemical cell, comprising two electrodes, in accordance with some examples.

FIG. 4 is a schematic illustration of electrochemical cell 450, comprising positive electrode 470, negative electrode 480, and layered gel-polymer electrolyte 100, arranged in a stack, wound jelly-roll, or any form. Layered gel-polymer electrolyte 100 is disposed between the positive electrode 470 and the negative electrode 480 to prevent direct contact between the positive electrode 470 and the negative electrode 480 yet allows ionic communication between these electrodes. It should be noted a separator is not needed in these examples. Layered gel-polymer electrolyte 100 is operable as an ionic source and ionic transport and also as a separator preventing direct contact between the positive electrode 470 and the negative electrode 480 and electrical shorts between the positive electrode 470 and the negative electrode 480. Specifically, layered gel-polymer electrolyte 100 may include pores, soaked with liquid electrolyte, which allows ions to pass between the positive electrode 470 and negative electrode 480. The positive electrode 470, negative electrode 480, and other components of the cell may be enclosed and separated from the environment by case 460 and lid 462. In some examples, case 460 and/or lid 462 may operate as terminals of electrochemical cell 450, in which case current collectors of positive electrode 470 and/or negative electrode 480 may be connected to case 460 and/or lid 462. Some examples of electrochemical cell 450 include, but are not limited to, lithium-ion batteries, lithium polymer batteries, lithium-air batteries, lithium sulfite batteries, lithium metal batteries, solid-state batteries, supercapacitors, and the like.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

The invention claimed is:

1. A method of fabricating an electrochemical cell, the method comprising:
dissolving one or more polymer materials in one or more solvents, thereby forming a polymer solution;
coating the polymer solution onto a support core comprising a first surface and a second surface, opposite of the first surface, wherein:
the polymer solution is coated on the first surface, thereby forming a first interface layer on the first surface of the support core, and
the polymer solution is coated on the second surface, thereby forming a second interface layer on the second surface of the support core;
introducing a liquid electrolyte into at least one of the support core, the first interface layer, and the second interface layer, thereby forming a layered gel-polymer electrolyte; and
after introducing the liquid electrolyte, laminating a stack comprising a positive electrode, the layered gel-polymer electrolyte comprising the liquid electrolyte, and a negative electrode, such that the layered gel-polymer electrolyte is positioned between the positive electrode and the negative electrode,
wherein, after laminating, the first interface layer conforms to the positive electrode to ensure conformal contact with the positive electrode,
wherein, after laminating, the second interface layer conforms to the negative electrode to ensure conformal contact with the negative electrode,
wherein the first interface layer has a first thickness selected based on a surface roughness of the positive electrode,
wherein the second interface layer has a second thickness, different from the first thickness, and selected based on a surface roughness of the negative electrode, different from the surface roughness of the positive electrode, and
wherein a portion of the liquid electrolyte is transferred from the layered gel-polymer electrolyte to both the positive electrode and the negative electrode, while and after laminating the stack.

2. The method of claim 1, further comprising adding one or more fillers to the polymer solution.

3. The method of claim 2, wherein the one or more fillers comprise one or more of titanium dioxide ($TiO_2$) particles, silicon dioxide ($SiO_2$), aluminum oxide ($Al_2O_3$), sulfide compounds, garnet structure oxides, NASICON-type phosphate glass ceramics (LAGP), oxynitrides, and AB3-type hydrogen storage alloy.

4. The method of claim 1, further comprising adding water to the polymer solution.

5. The method of claim 1, wherein introducing the liquid electrolyte into at least one of the support core and the first interface layer comprises degassing the support core and the first interface layer.

6. The method of claim 1, wherein the liquid electrolyte comprises an electrolyte solvent and an electrolyte salt.

7. The method of claim 1, wherein the support core comprises at least one of polypropylene (PP), polyethylene (PE), poly(ethylene-co-tetrafluoroethylene (PETFE), poly (ethylenechloro-co-trifluoroethylene), polystyrene, polyvinyl chloride polypropylene, polyamide, polyimide, polyacrylic, polyacetal, polycarbonate, polyester, polyetherimide, polyimide, polyketone, polyphenylene ether, or polyphenylene sulfide.

8. The method of claim 1, wherein the support core has a porosity of between 30% and 60%.

9. The method of claim 1, wherein the support core comprises a surface layer, forming at least one of the first surface or the second surface of the support core, wherein the surface layer comprises one or more ceramic materials.

10. The method of claim 9, wherein the one or more ceramic materials of the surface layer of the support core comprise at least one of $Al_2O_3$, $SiO_2$, or MgO.

11. The method of claim 1, wherein the first interface layer comprises at least one of polyvinylidene fluoride-co-hexafluoropropylene (PVDF-HFP), polyacrylonitrile (PAN), poly(methyl methacrylate) (PMMA), or polyethylene oxide (PEO).

12. The method of claim 1, wherein the first interface layer has a porosity of between 30% and 60%.

13. The method of claim 1, wherein the liquid electrolyte is distributed within both the support core and the first interface layer.

14. The method of claim 1, wherein the first interface layer has a thickness of at least 20 micrometers.

15. The method of claim 1, wherein the first interface layer has a thickness of at least 50 micrometers.

16. The method of claim 1, wherein a thickness of the first interface layer is greater than a surface roughness of the positive electrode.

17. The method of claim 16, wherein a thickness of the second interface layer is greater than a surface roughness of the negative-electrode.

* * * * *